(12) United States Patent
Brunermer

(10) Patent No.: US 8,568,124 B2
(45) Date of Patent: Oct. 29, 2013

(54) POWDER SPREADER

(75) Inventor: Dan Brunermer, Leechburg, PA (US)

(73) Assignee: The Ex One Company, North Huntington, PA (US)

( * ) Notice: Subject to any disclaimer, the term of this patent is extended or adjusted under 35 U.S.C. 154(b) by 37 days.

(21) Appl. No.: 13/091,251

(22) Filed: Apr. 21, 2011

(65) Prior Publication Data

US 2012/0266815 A1 Oct. 25, 2012

(51) Int. Cl.
- *B29C 35/08* (2006.01)
- *B28B 1/16* (2006.01)
- *B05C 11/00* (2006.01)

(52) U.S. Cl.
USPC ........ 425/174.4; 425/375; 425/470; 118/106; 118/257; 700/98; 700/119

(58) Field of Classification Search
USPC ......... 425/174.4, 375, 470, 471; 700/98, 119; 264/241, 442–444, 485, 494–496, 308; 427/189; 118/106, 257
See application file for complete search history.

(56) References Cited

U.S. PATENT DOCUMENTS

| | | | |
|---|---|---|---|
| 5,387,380 A | 2/1995 | Cima et al. | |
| 5,597,589 A | 1/1997 | Deckard | |
| 5,753,274 A * | 5/1998 | Wilkening et al. | 425/174.4 |
| 5,786,562 A * | 7/1998 | Larson | 219/137 R |
| 6,381,830 B1 * | 5/2002 | Chikuba et al. | 29/557 |
| 6,554,600 B1 * | 4/2003 | Hofmann et al. | 425/174.4 |
| 6,764,636 B1 * | 7/2004 | Allanic et al. | 264/401 |
| 6,941,940 B1 * | 9/2005 | Zavattari et al. | 125/16.02 |
| 6,945,242 B2 * | 9/2005 | Kondo et al. | 125/21 |
| 7,204,684 B2 * | 4/2007 | Ederer et al. | 425/174.4 |
| 7,828,022 B2 | 11/2010 | Davidson et al. | |
| 2001/0048184 A1 * | 12/2001 | Ueno | 264/401 |
| 2005/0280185 A1 | 12/2005 | Russell et al. | |
| 2006/0105102 A1 * | 5/2006 | Hochsmann et al. | 427/180 |
| 2006/0175346 A1 * | 8/2006 | Ederer et al. | 222/56 |
| 2009/0035411 A1 | 2/2009 | Seibert et al. | |
| 2009/0169664 A1 * | 7/2009 | Cox | 425/174.4 |
| 2010/0272519 A1 | 10/2010 | Ederer et al. | |
| 2011/0316178 A1 * | 12/2011 | Uckelmann | 264/16 |

* cited by examiner

*Primary Examiner* — Dimple Bodawala
(74) *Attorney, Agent, or Firm* — Thomas Lizzi

(57) ABSTRACT

Powder spreaders suitable for use with layered manufacturing processes are disclosed in which a strip of flexible material of a width which spans the powder bed is used to spread, level, and, optionally, compact deposited powder to form a layer of the powder bed. The strip surface moves relative to the deposited powder it is spreading as the working portion of the strip, i.e., the portion of the strip that is in contact with the powder, traverses across the powder bed so that it can provide lift to the powder in front of it and, optionally, compaction to the powder below it. The working portion of the strip can be configured to have its leading and trailing surface contours to be different from one another, and, optionally, to have these contours and its bottom edge contour be independently adjustable. Layered manufacturing systems comprising such powder spreaders are also disclosed.

23 Claims, 7 Drawing Sheets

US 8,568,124 B2

POWDER SPREADER

FIELD OF THE INVENTION

The present invention relates to an apparatus for spreading powder uniformly across a surface to initiate or add to a powder bed, especially a powder bed suitable for a layered manufacturing process.

BACKGROUND OF THE INVENTION

Powder spreaders play an important role in the initiation and creation of powder beds that are used in layered manufacturing processes known as free form fabrication processes. In free form fabrication processes, the powder bed is formed layer by layer upon a support surface. Typically, the thickness of the powder layer is about the same as the average powder particle thickness of the powder which is being spread or a multiple thereof. Confining walls are supplied beforehand or constructed in situ as the process proceeds to retain the powder layers in place to form the bed. After a powder layer is spread, powder particles in selected portions of the powder layer may be bonded together and/or to an underlying layer through the selective exposure of the powder bed to radiation and/or a fluid to form a two-dimensional slice of one or more three-dimensional objects. This step of selective exposure of a powder layer is sometimes referred to in the art as "printing" and the layer after printing is referred to as a "printed layer," regardless of the agent to which the powder layer is being selectively exposed. The free form fabrication layer proceeds layer by layer until the entire three-dimensional object or objects have been printed.

Some examples of free form manufacturing processes are the three-dimensional printing ("3DP") process and the Selective Laser Sintering ("SLS") process. An example of the 3DP process may be found in U.S. Pat. No. 6,036,777 to Sachs, issued Mar. 14, 2000. An example of the SLS process may be found in U.S. Pat. No. 5,076,869 to Bourell et al., issued Dec. 31, 1991.

It is critical to the success of free form fabrication processes that each powder layer approximate a flat sheet of uniform thickness and density so that each printed layer corresponds geometrically to the intended two-dimensional slice of the object that is being created. Inasmuch as each layer is often on the order of just a few thousands of an inch thick (roughly, a few scores of microns), it is not uncommon for an object to be made from hundreds, or even thousands, of such layers. Even small distortions in the thickness or density uniformity of each layer can add up to substantial distortions in the free form fabricated object.

Until now, nearly all free form fabrication processes have used one of three types of powder spreaders. One type relies on the powder dispenser to dispense a uniform layer of power as it travels across the bed. Examples of this type are found in U.S. Pat. No. 7,828,022 B2 to Davidson et al., U.S. Pat. No. 6,672,343 B1 to Perret et al. and U.S. Patent Publication No. US 2010/0272519 A1 of Ederer et al. A second type comprises a blade which is at least as long as the intended powder bed is wide that is wiped across the powder bed surface to spread out powder that is deposited by a powder dispenser. Examples of this type of powder spreader are found in U.S. Pat. No. 5,387,380 to Cima et al. and U.S. Pat. No. 6,799,959 B1 to Tochimoto et al. The third type comprises a roller which is at least as long as the intended powder bed is wide that is traversed across the powder bed surface to spread out powder that is deposited by a powder dispenser. The roller is rotated in a direction which is opposite to that which the roller would rotate if it were simply being rolled across the powder bed surface. Such "counter-rotation" roller powder spreaders have been found to give superior results to the blade powder spreaders because the rotating action of the roller picks up and redistributes the dispensed powder in front of the roller as it is encountered instead of just pushing the powder pile thus better overcoming the distribution disparities of the as-deposited powder. The rotation action at the trailing side of the roller provides a consistent gentle compaction of the powder. Examples of the counter-rotating spreaders are given in U.S. Pat. No. 5,597,589 to Deckard and U.S. Patent Publication US 2001/0050448 A1 of Kubo et al.

Counter-rotation rollers have their limitations. The rollers are supported and driven at their ends. Typically, they are made of hardened steel or coated aluminum and are precision ground to provide concentricity and straightness. They are also provided with a surface finish that is conducive to the front of the roller lifting and the trailing portion of the roller compacting the powder with which it is to be used. Their diameters are kept small, e.g., on the order of less than 2 inches (5.1 cm), because the compaction force of the trailing side of the roller increases as the roller diameter increases and too much compaction force may degrade or destroy the printed powder bonds of the underlying printed layers. Although short counter-rotation rollers have proven to be effective, as they become longer to accommodate larger powder beds, their small diameters tend to result in increasing amounts of wobble and flexing of the roller during use which compromises the flatness and uniformity of the powder bed. For example, a twelve inch long, two-inch diameter roller was measured to have 0.002 inches of wobble (50 microns), which can be an intolerable amount for layer thicknesses on the order of 0.003 inches (76 microns).

Individual counter-rotation rollers have the further disadvantage of lacking versatility with regard to the types and sizes of powders with which they can be used. As mentioned above, their diameters and surface finishes are tailored to provide the desired balance of powder lift and compaction for the particular types of powders with which they are expected to be used. Also, their electrical conductivities and magnetic properties are fixed and this further restricts the types and sizes of powders with which they can be optimally used inasmuch as even small electrostatic and magnetic forces can have large attractive or repulsive effects on individual powder particles. Moreover, the roller's leading surface, i.e., the portion of the roller's surface that is in contact with the powder that is ahead of the direction of the roller's travel across the bed (the "leading powder"), has the same contour as the roller's trailing surface, i.e, the portion of the roller's surface that is in contact with the powder that is in the direction opposite to the roller's direction of travel across the bed (the "trailing powder"). This configuration precludes the independent control of the lift and compaction provided by the roller.

SUMMARY OF THE INVENTION

The present invention provides a versatile powder spreader that overcomes many of the disadvantages of the prior art counter-rotation roller powder spreaders.

Embodiments of the present invention provide powder spreaders in which a strip of flexible material of a width which spans the powder bed is used to spread, level, and, optionally, compact deposited powder to form a layer of the powder bed. Like a counter-rotating roller, the strip surface moves relative to the deposited powder it is spreading as the working portion of the strip, i.e., the portion of the strip that is in contact with the powder, traverses across the powder bed so that it can provide lift to the powder in front of it and, optionally, compaction to the powder below it. However, unlike a counter-rotating roller, the working portion of the strip can be configured to have its leading and trailing surface contours to be different from one another, and, optionally, to have these contours and its bottom edge contour be independently adjustable.

The present invention also includes layered manufacturing systems comprising such powder spreaders.

BRIEF DESCRIPTION OF THE DRAWINGS

The criticality of the features and merits of the present invention will be better understood by reference to the attached drawings. It is to be understood, however, that the drawings are designed for the purpose of illustration only and not as definitions of the limits of the present invention.

DESCRIPTION OF PREFERRED
EMBODIMENTS OF THE INVENTION

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims.

Whenever the term "about" is used herein or in the appended claims to modify a feature of an embodiment of the present invention, it is to be construed as referring to the ordinary tolerances related to making and/or measuring the relevant feature. Whenever a range is used herein or in the appended claims to describe a feature of an embodiment of the present invention, the range is to be construed as including the stated end points of the range and every point therebetween.

Figure 1:
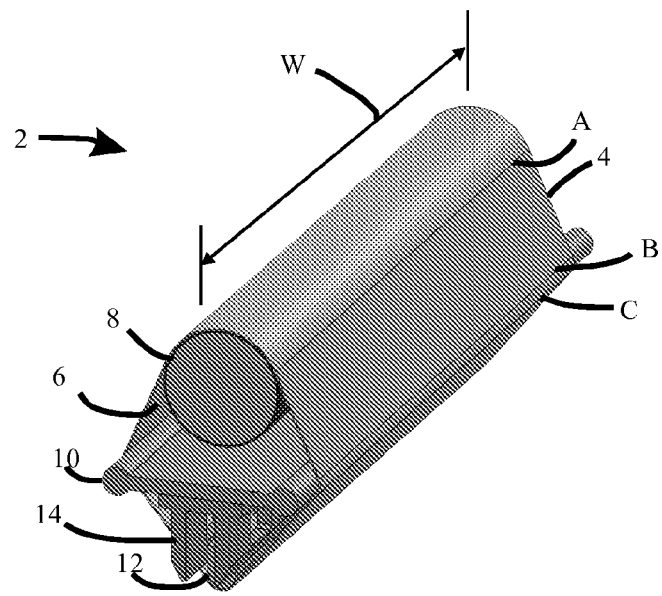
FIG. 1 is a schematic perspective view of a first powder spreader according to an embodiment of the present invention.

For convenience of description, in FIGS. 1 through 8 and 11 through 12 there are shown schematic representations of powder spreaders in accordance with embodiments of the present invention without their transporting and support mechanisms (including its supporting spindles). Referring now to FIG. 1, there is shown a first powder spreader 2 according to an embodiment of the present invention which comprises a strip of flexible material in the form of sleeve 4, which is of a width W that is sufficient to span the widths of the powder beds with which the powder spreader 2 is intended to be used. The shape of the sleeve 4 is maintained by contact of the sleeve's 4 inside surface 6 with the drive roll 8, the tension device 10, and the nose guide 12. The trace lines A, B, C indicate three of the limits of the contact regions between the sleeve 4 and the drive roll 8 and the right hand end of the tension device 10, respectively. The powder spreader 2 also comprises the stiffening element 14 which provides lateral support to the nose guide 12. The stiffening element 14 also provides vertical support to the nose guide 12 by way of a plurality of adjustable supports, e.g., support 16.

Figure 2:
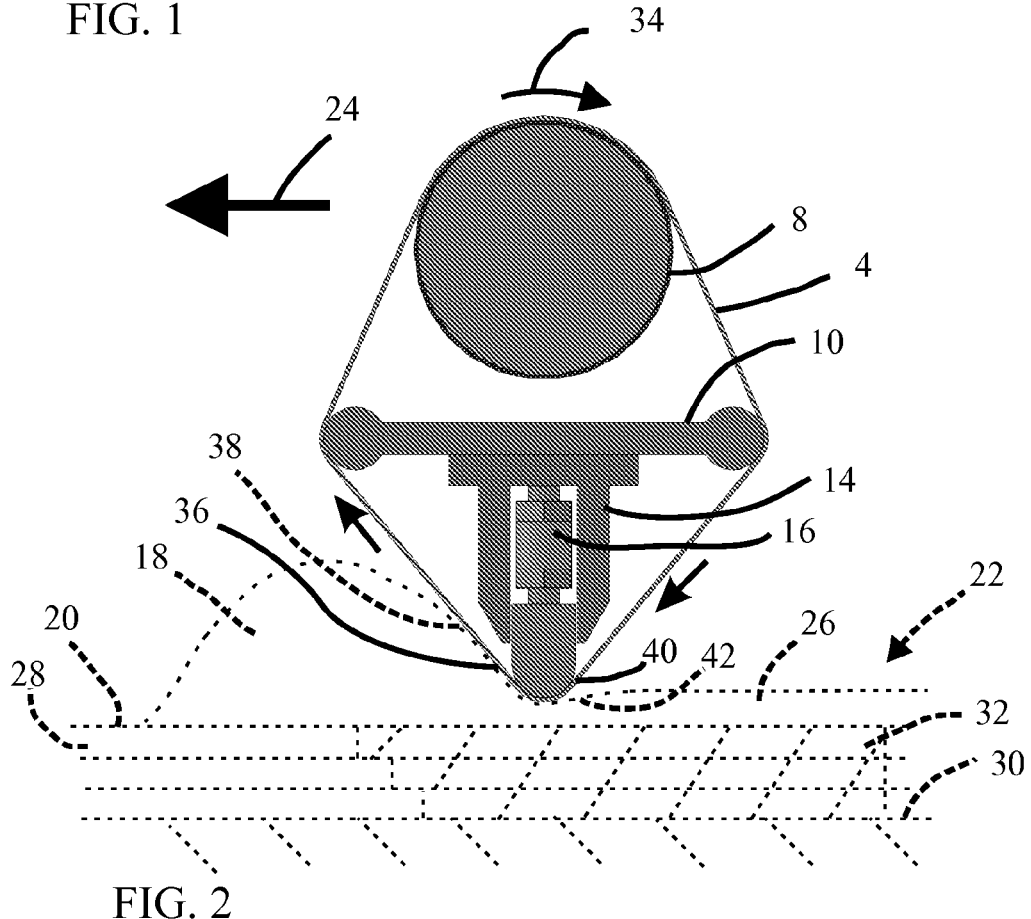
FIG. 2 is a schematic side elevational view of the first powder spreader of FIG. 1 interacting with dispensed powder to form a layer of a powder bed (shown with ghost lines) of a free form fabrication process.

FIG. 2 schematically depicts the powder spreader 2 as it spreads deposited powder 18 across the surface 20 of powder bed 22 in the direction of arrow 24 to form new layer 26. The powder bed 22 consists of multiple powder layers, e.g., layer 28, which have been formed upon a support surface 30. After being formed, selected regions of each of the powder layers, e.g., region 32 (indicated by hash lines), were bonded together and to underlying layers by exposure to a binding agent.

As the powder spreader 2 traverses across the length of the powder bed 22 in the direction of arrow 24, the drive roll 8 rotates in the direction of the arrow 34 causing the sleeve 4 to be driven in what in FIG. 2 is the clockwise direction. This causes the leading surface 36 of the sleeve 4, i.e., the portion of sleeve 4 which is in contact with the deposited powder 18, to lift the powder it is in contact with, i.e., the leading powder 38, to effectively cascade the pile of deposited powder 18 forward across the powder bed surface 20. It also causes the trailing surface 40 of the sleeve 4 to drive some of the trailing powder 42 downward, thus compacting the powder into the powder bed 22 as layer 26 is being formed. These lifting and compaction actions are similar to those which are provided by a conventional counter-rotating roller.

Figure 3:
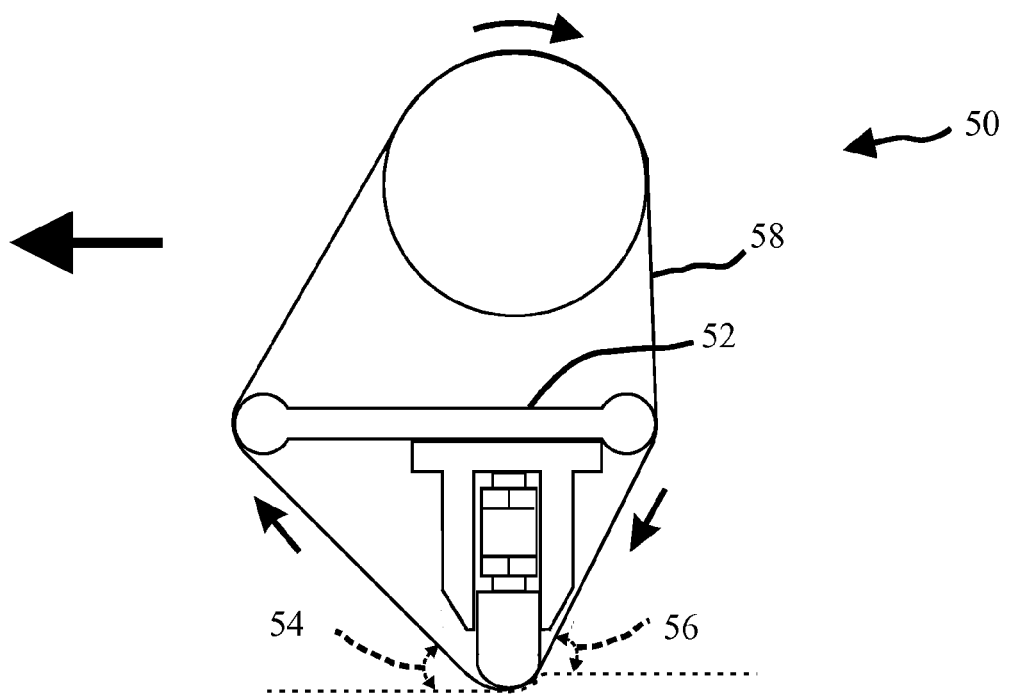
FIG. 3 is a schematic side elevational view of a second powder spreader with the powder bed surface depicted by ghost lines.

However, unlike a conventional counter-rotating roller, the powder spreaders of the present invention allow better control of the amount of lift and compaction which are applied to the deposited powder 18 by allowing for better control of three parameters: (a) the lead angle, (b) the powder bed contact area, and (c) the trailing angle. Referring now to FIG. 3, there is a schematic end view of a second powder spreader 50 according to another embodiment of the present invention. The second powder spreader 50 is similar to the first powder spreader 2 of FIGS. 1 and 2, except that its tension device 52 has been moved forward (with respect to the direction of travel indicated by arrow 24) thus decreasing the lead angle 54 and increasing the trailing angle 56 that the sleeve 58 makes with respect to the existing powder bed surface. The decreased lead angle 54 tends to decrease the amount of lift of the leading powder and the increased trailing angle 56 tends to increase the amount of compaction of powder bed.

Figure 4:
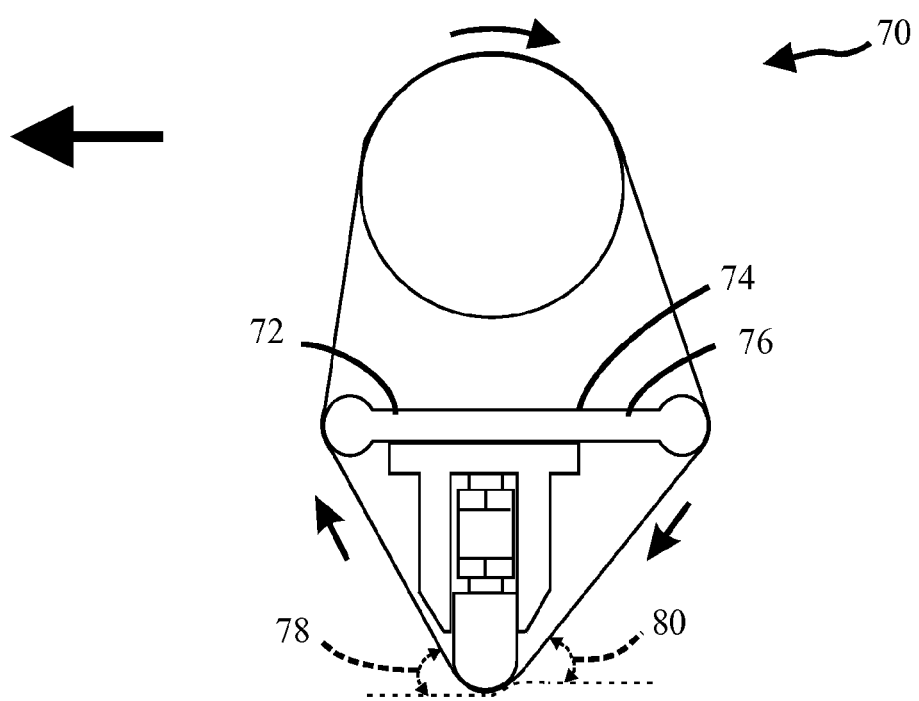
FIG. 4 is a schematic side elevational view of a third powder spreader with the powder bed surface depicted by ghost lines.

Referring now to FIG. 4, there is shown a schematic end view of a third powder spreader 70 according to another embodiment of the present invention. The third powder spreader 70 also is similar to the first powder spreader 2, except that the leading arm 72 of its tension device 74 has been shortened, while leaving its trailing arm 76 unchanged from that of the first powder spreader 2. This has the effect of increasing the lead angle 78 while maintaining the trailing angle 80 the same as it was for first powder spreader 2.

Figure 5:
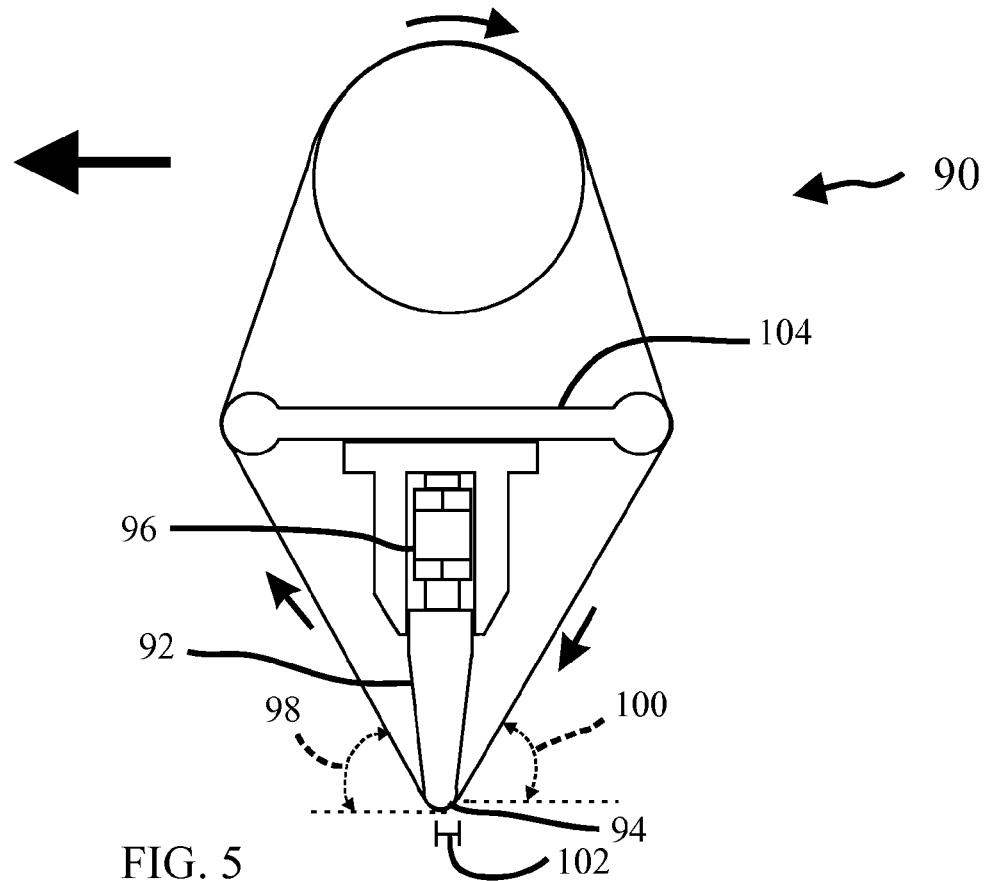
FIG. 5 is a schematic side elevational view of a fourth powder spreader with the powder bed surface depicted by ghost lines.

Referring now to FIG. 5, there is shown a schematic end view of a fourth powder spreader roller 90 according to another embodiment of the present invention. The fourth powder spreader 90 is similar to the first powder spreader 2 except for two important differences. First, the nose guide 92 of the fourth powder spreader 90 is longer, narrower, and has a smaller radius of curvature at its working end 94 than does the nose guide 12 of the first powder spreader 2. Also, the adjustable support 96 has been lengthened with respect to the adjustable support 16 of the first powder spreader 2. These differences result in increases in the lead and trailing angles 98, 100 for the fourth powder spreader 90 in comparison to those of the first powder spreader 2. They also result in the bed contact area 102 being smaller of the fourth powder spreader than that of the first powder spreader 2.

Figure 6:
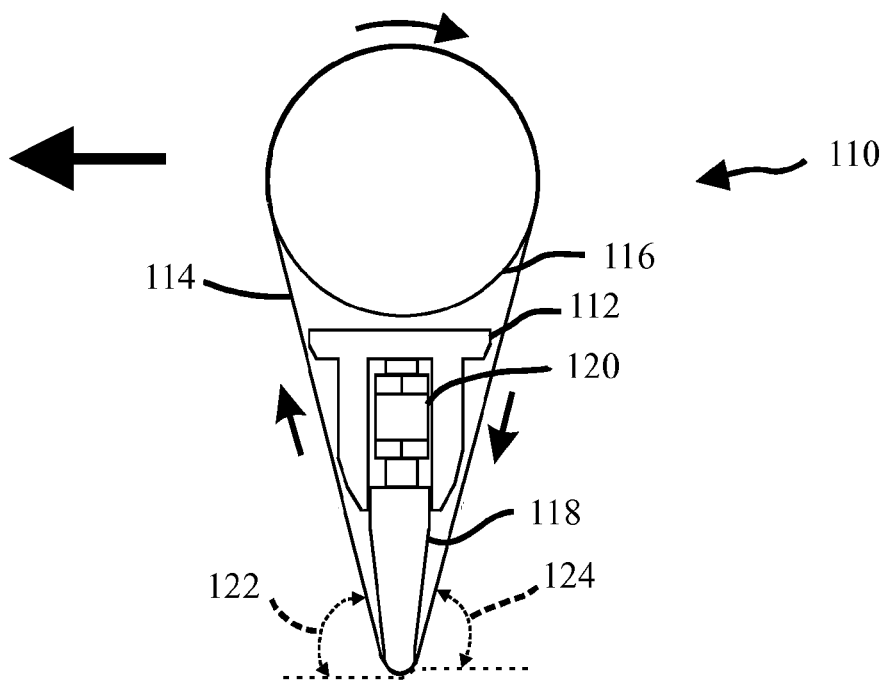
FIG. 6 is a schematic side elevational view of a fifth powder spreader with the powder bed surface depicted by ghost lines.

Referring now to FIG. 6, there is shown a fifth powder spreader 110 according to another embodiment of the present invention. The fifth powder spreader 110 is similar to fourth spreader 90 except that the fifth powder spreader 110 has no tension device corresponding to the tension device 104 of the fourth powder spreader 90 and corners of the stiffening element 112 of the fifth powder spreader have been trimmed back to avoid contact with the sleeve 114. The inside surface of the sleeve 114 of the fifth powder spreader 110 contacts only the drive roll 116 and the nose guide 118. The tension of the sleeve 114 may be selectively controlled by adjusting the distance between the drive roll 116 and the nose guide 118, e.g., by adjusting the length of the support 120. Note that the lead and trailing angles 122, 124 of the fifth powder spreader 110 are larger than the lead and trailing angles 98, 100, respectively, of the fourth powder spreader 90.

Figure 7:
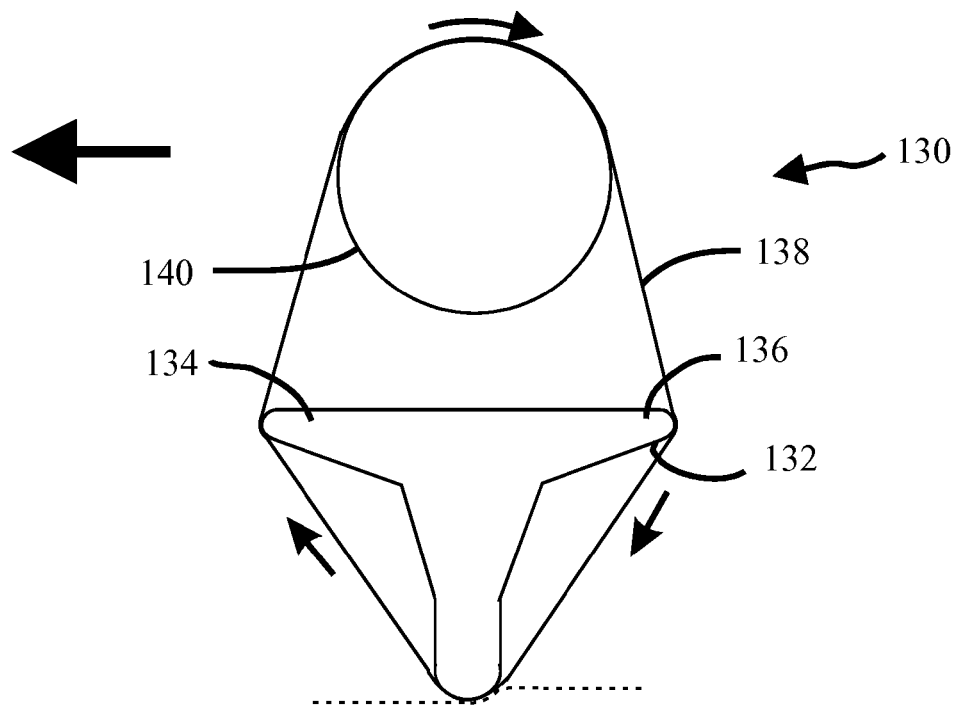
FIG. 7 is a schematic side elevational view of a sixth powder spreader with the powder bed surface depicted by ghost lines.

For reasons that are explained below, it is preferred that the powder spreaders of the present invention include at least one adjustable support, e.g., support 16 of first powder spreader 2 shown in FIGS. 1 and 2, along its width. However, in some embodiments of the present invention, the powder spreader has none. In such embodiments, it is preferred that the nose guide have a greater stiffness, i.e., resistance to lateral and vertical deflection (including gravitational sag), of a counter-rotation roller which would provide similar amount of powder lift. Such an embodiment is shown in FIG. 7 as the sixth powder spreader 130. The sixth powder spreader 130 has a stiff nose guide 132 which is of fixed dimensions. The ends of the leading and trailing arms 134, 136, respectively, of the nose guide 132 contact the inner surface of the sleeve 138 to act as a lateral tensioning device. The nose guide 132 may be solid or hollow, in part or in whole, so long as it has sufficient stiffness to yield the desired amount of control over the shape of the surface of the powder bed. In this embodiment, the tension of the sleeve 138 is controlled by selectively adjusting the distance between drive roll 140 and the nose guide 132 by way of adjusting one or both of their respective supporting mechanisms.

Figure 8:
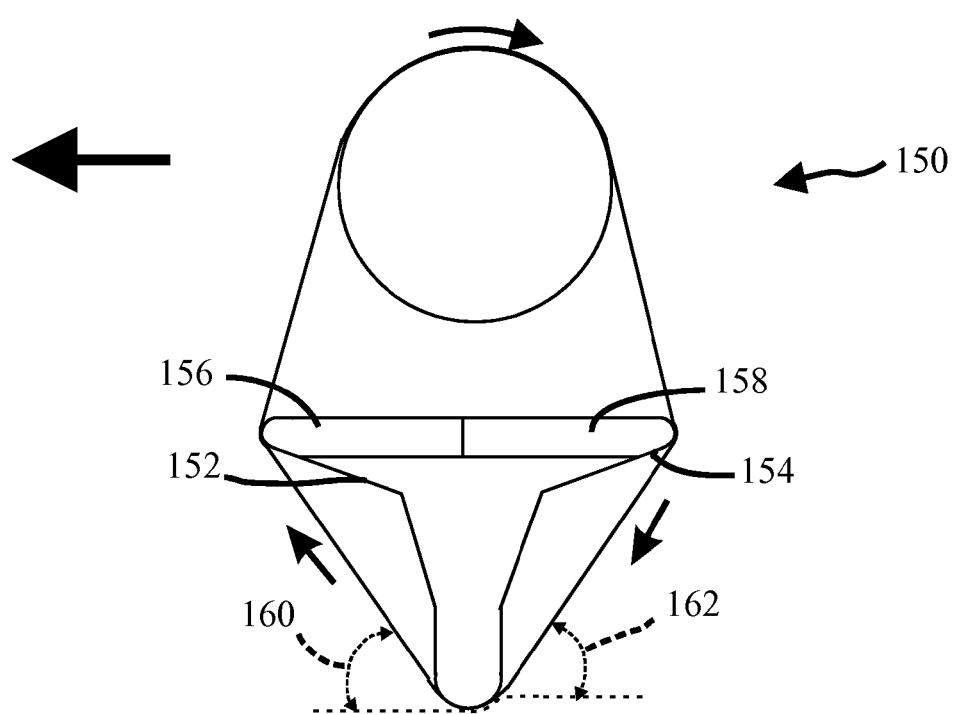
FIG. 8 is a schematic side elevational view of a seventh powder spreader with the powder bed surface depicted by ghost lines.

Referring now to FIG. 8, there is shown a seventh powder spreader 150 according to another embodiment of the present invention. The seventh powder spreader 150 is the same as the sixth powder spreader 130 except that the nose guide 152 is fastened to a tension device 154 which has leading and trailing arms 156, 158 which are separately selectively fixedly adjustable laterally so as to selectively control the lead and trailing angles 160, 162, respectively.

It is to be understood that although each of the embodiments of the present invention that are described in FIGS. 1-8 comprise a single drive roll, some other embodiments of the present invention comprise multiple drive rolls. A single drive roll is preferred unless the surface rotation speeds of the multiple drive rolls are synchronized to avoid any unintended stretching or loosening the portions of the sleeve between the driven rolls.

Figure 9:
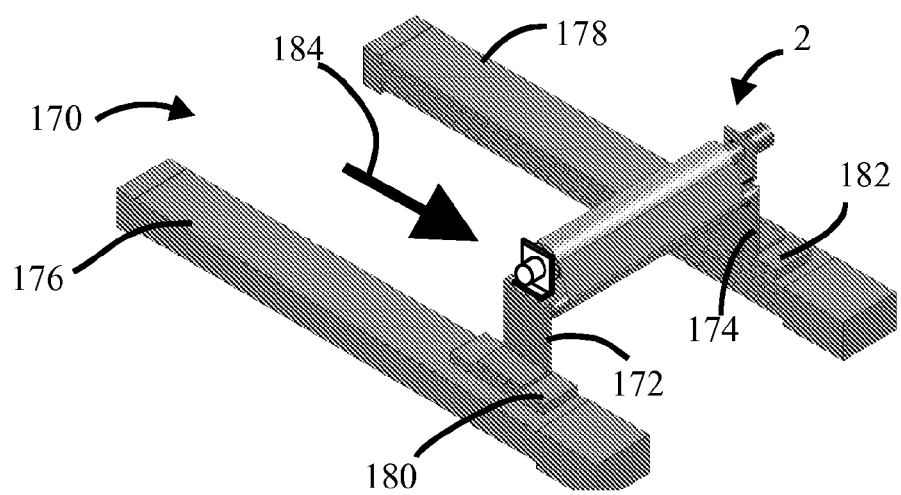
FIG. 9 is a schematic perspective view of the first powder spreader of FIG. 1 supported on a horizontal drive apparatus.

Referring now to FIG. 9, there is shown a schematic perspective view of the first powder spreader 2 mounted upon a transport device 170 by way of the first and second supports 172, 174. The transport device 170 has two parallel tracks, the first and second tracks 176, 178, upon which ride two carriages, the first and second carriages 180, 182. In use, the parallel first and second tracks 176, 178 are located so as to be parallel to the longitudinal edges of the powder bed that is to be created. The direction of travel in forming the powder bed (not shown) is indicated by arrow 184.

Figure 10:
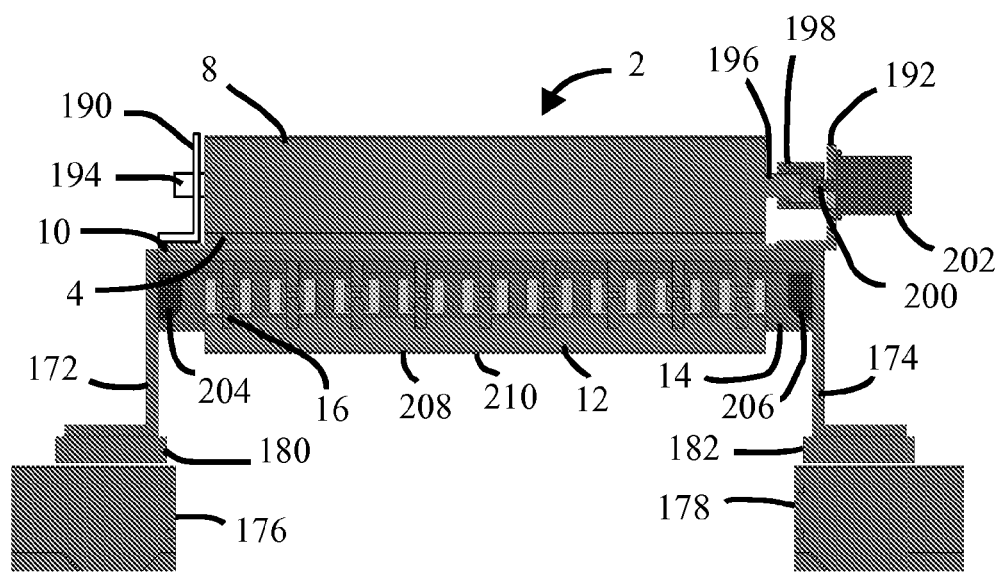
FIG. 10 is a schematic elevation view of the powder spreader of FIG. 9 showing the leading side of the powder spreader and with the front side of the sleeve cut away to reveal other elements of the powder spreader.

FIG. 10 shows the leading side of the first powder spreader 2 situated as it was in FIG. 9 with the front facing portion of the sleeve 4 removed from the schematic so as to show the details of other elements of the first powder spreader 2. The drive roll 8 is supported by the first and second brackets 190, 192 by way of the first and second spindles 194, 196 which extend axially from the opposite ends of the drive roll 8. The first spindle 194 extends through a bearing (not shown) in an aperture (not shown) in first bracket 190. The second spindle 196 is connected to a coupling 198. The opposite end of the coupling 198 is connected to the spindle 200 of the drive motor 202 and the drive motor 202 is removably fastened to the second bracket 192 and spindle 200 of motor 202 extends through an aperture in second bracket 192 (these connections are shown in cross-section in FIG. 10 for better clarity).

The first and second brackets 190, 192 are removably fastened to the top surface of the tension device 10. The tension device 10 is removably fastened at its ends to the first and second supports 172, 174 which in turn are removably fastened to the first and second carriages 180, 182 which travel back and forth along the first and second tracks 176, 178 as the powder bed is being built up one layer at a time. The stiffening element 14 is fastened to the bottom side of the tension device 10 as described above with regard to FIGS. 1 and 2. The stiffening element 14 is also removably fastened to or at least laterally constrained on one or both of its leading and trailing sides by brackets, e.g., the third and fourth brackets 204, 206.

A plurality of adjustable supports, e.g., support 16, depend from and are removably fastened to the tension device 10, and support and are removably fastened to the nose guide 12. The length of one or more of the plurality of adjustable supports is selectively adjustable. By adjusting each length separately, the contour of the bottom edge 208 of the nose guide 12 can be controlled. This makes it possible to eliminate the sag that would bend into a downward convex arc the contour of the bottom surface of a long conventional counter-rotation roller. Each of the plurality of adjustable supports may be a mechanical (e.g., a turnbuckle), hydraulic, pneumatic, or piezoelectric device which permits small incremental length adjustments, preferably on the order of a thousandth of an inch (25 microns). Since the sleeve 4 conforms to the contour of the bottom edge 208 of the nose guide 12, this makes it possible to control the bottom contour 210 of the sleeve 4 as well. This is an advantage over the conventional counter-rotation powder spreaders and even over some powder spreader embodiments of the present invention, such as those shown in FIGS. 7 and 8, which lack the ability to adjust the contour of the bottom edge of their nose guides.

Figure 11:
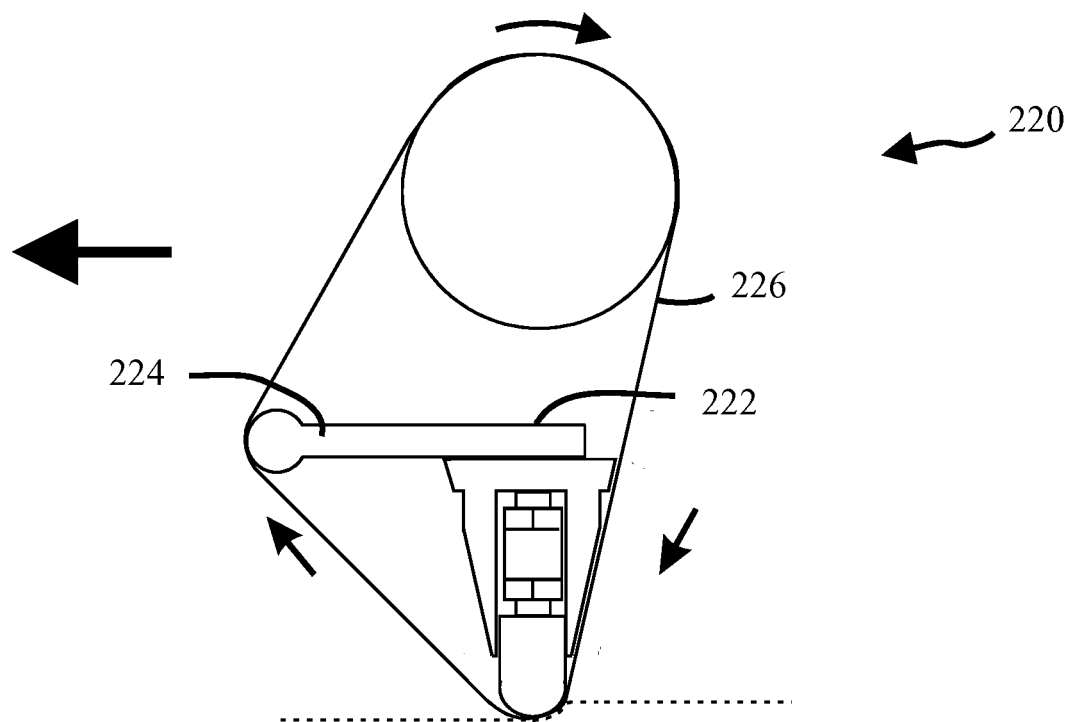
FIG. 11 is a schematic side elevational view of a eighth powder spreader with the powder bed surface depicted by ghost lines.

It is to be understood that the support and transporting systems shown in FIGS. 9-10 are just illustrative examples of how powder spreaders of the present invention can be supported and transported. Other systems can be used, including those that support and transport the powder spreader from an overhead gantry, e.g., as disclosed by WO 2005/097476 of Z Corporation. In some embodiments of the present invention, the support system permits the distance between the drive roll and the working end of the nose guide to be adjusted to control the tension of the sleeve and to facilitate the replacement of the sleeve while other embodiments lack such adjustability. In some embodiments, the distance between the ends of the arms of the tension device is adjustable to provide control of the tension of the sleeve. In embodiments in which the tension device has only a single arm in contact with the sleeve, the position of the end of that arm with respect to the vertical centerline of the powder spreader is adjustable to provide control of the tension of the sleeve. An example of such an embodiment is shown in FIG. 11 as eighth powder spreader 220 which has a tension device 222 having a single arm 224 with an end in contact with the sleeve 226. The position of the end of the arm 224 may be fixed or, preferably, may be laterally adjustable.

Figure 12:
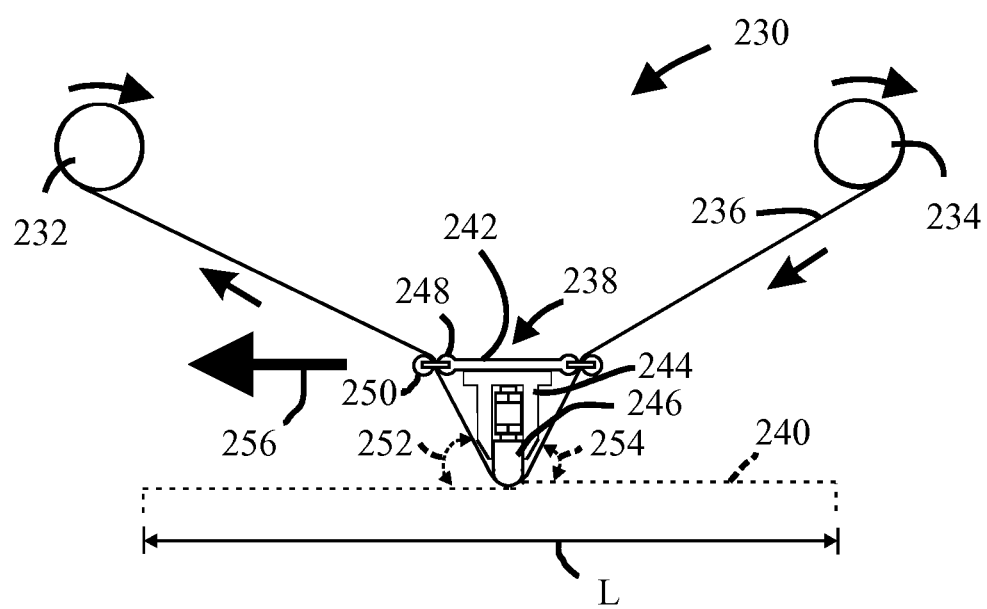
FIG. 12 is a schematic side elevational view of a ninth powder spreader with the powder bed surface depicted by ghost lines.

Powder spreaders of the present invention also include embodiments in which the strip of flexible material is in the form of a belt that is alternatively let out and taken up by two cooperating reels. FIG. 12 shows such an embodiment in the form of a ninth powder spreader 230. The ninth powder spreader 230 includes the first and second reels 232, 234 which are operably mounted on stationary supports (not shown) and are motor driven to synchronously let out and take up the belt 236 at a selected rate, first in the one direction so that the first reel 232 is the supply reel and the second reel 234 is the take up reel and then in the other, so that the second reel 234 is the supply reel and the first reel 232 is the take up reel. In the situation shown in FIG. 12, the first reel 232 is operating as the take up reel. The ninth spreader 230 also includes a movable spreader portion 238 which guides the belt 236 as the spreader portion 238 moves across the powder bed 240 either to form a powder layer or to return to a home position.

The spreader portion 238 is mounted on a supporting and transporting device (not shown), e.g., such as those shown in FIGS. 9 and 10, for moving it back and forth across the length L of the powder bed 240. The spreader portion 238 includes a tension device 242, a stiffening element 244, and a nose guide 246. Each end of the tension device 242 comprises a pair of guide surfaces, e.g., the first and second guide surfaces 248, 250, one or both of which guide the belt 236 so as to control the magnitude of the lead and trailing angles 252, 254. Preferably, the length of the tension device 242 and the positions of its guide surfaces are selectable so as to provide selectable control of the magnitude of the lead and trailing angles 252, 254. The stiffening element 244 and the nose guide 246 may have characteristics similar to the stiffening elements and nose guides described for the first through eighth embodiments of the present invention.

In operation, the spreader portion 238 moves across the powder bed 240 on its transport device in the direction of arrow 256 to redistribute deposited powder (not shown) to form a new layer on the surface of powder bed 240. As it moves, the first and second reels 232, 234 synchronously rotate to cause the belt 236 to pass by the guide surfaces at the ends of the tension device 242 and around the nose guide 246 to provide the desired amount of lift and compression of the powder.

In powder spreaders of the present invention which include a tension device, the end or ends or guide surfaces of the tension device and the nose guide which are in contact with the sleeve or belt are configured to provide as little resistance to the rotation of the sleeve or belt as possible while providing rigidity sufficient to maintain the desired amount of tension in the sleeve or belt. This may be done, for example, by configuring the portions of the tension device or nose guide that are in contact with the sleeve or belt to comprise a material having a very low coefficient of friction, e.g., high density polyethylene or polytetraflouroethylene, or to comprise one or more roller bearings. In addition to or as alternatives to the tension devices and nose guides described with reference to FIGS. 1-12, the tension or shape of the sleeve or belt can be controlled by idler pulleys or rollers which may contact one or both of the sleeve's or belt's inside or outside surface.

The strips of flexible material used in powder spreaders of the present invention have a surface which contacts the powder that is being spread. The properties of this material, e.g., its roughness, electrical conductivity, and magnetic properties, are preferably selected to provide the desired amount of interaction with the powder to provide the desired amount of lift and compaction to the powder without contaminating the powder or causing the powder to unduly stick to or become embedded in the surface. Preferably, the material selected from the group consisting of rubber, polytetraflouroethylene, polystyrene, and polyethylene. The inside surface of the strip and the surface of the drive roll or rolls are selected so as to provide the necessary amount of traction to the strip cause the strip to be driven by the drive roll or rolls without slippage that could lead to wear of the drive roll or rolls or the strip. In embodiments of the present invention wherein the strip is in the form of a sleeve, preferably the sleeve is in the form of an endless loop having no detectable end junction line. In sleeves having a detectable end junction line, it is preferred that the height or depth of the junction line be no greater than half of the average particle diameter of the powder which is to be spread so as to minimize distortions of the powder layer surface that might occur when the junction line passes over the nose guide.

The powder spreaders of the present invention may be used with any type of particulate or powder material. The particulate or powder materials may be coated or uncoated. Examples of such particulate or powder materials include metal powders, ceramic powders, sand, glass powders, plastic powders, and combinations thereof.

The surface speed of the strip of flexible material in powder spreaders of the present invention is selected to provide the desired amount of powder lift and compaction with respect to the powder type, amount of deposited powder to be moved by the powder spreader, the thickness of the powder layer, and the speed of traverse of the powder spreader across the powder bed. Too much speed may result in powder being thrown about in an undesirable fashion while too slow a speed may result in the powder spreader pushing the deposited powder along like a blade rather than rolling the deposited powder along in a cascading manner.

Although FIGS. 1-12 illustrate the powder spreaders of the present invention to spread the powder only in one direction when forming a powder bed, powder spreaders of the present invention may be used to spread powder first in one direction to form a layer and then in the opposite direction to form another layer, and so on. It is to be understood that the powder spreaders of the present invention may include computer controllers and sensor to control their operation. Additionally or alternatively, the powder spreaders of the present invention may be controlled and driven by external computer controllers, e.g., those of the layered manufacturing process equipment with which they are used.

Figure 13:
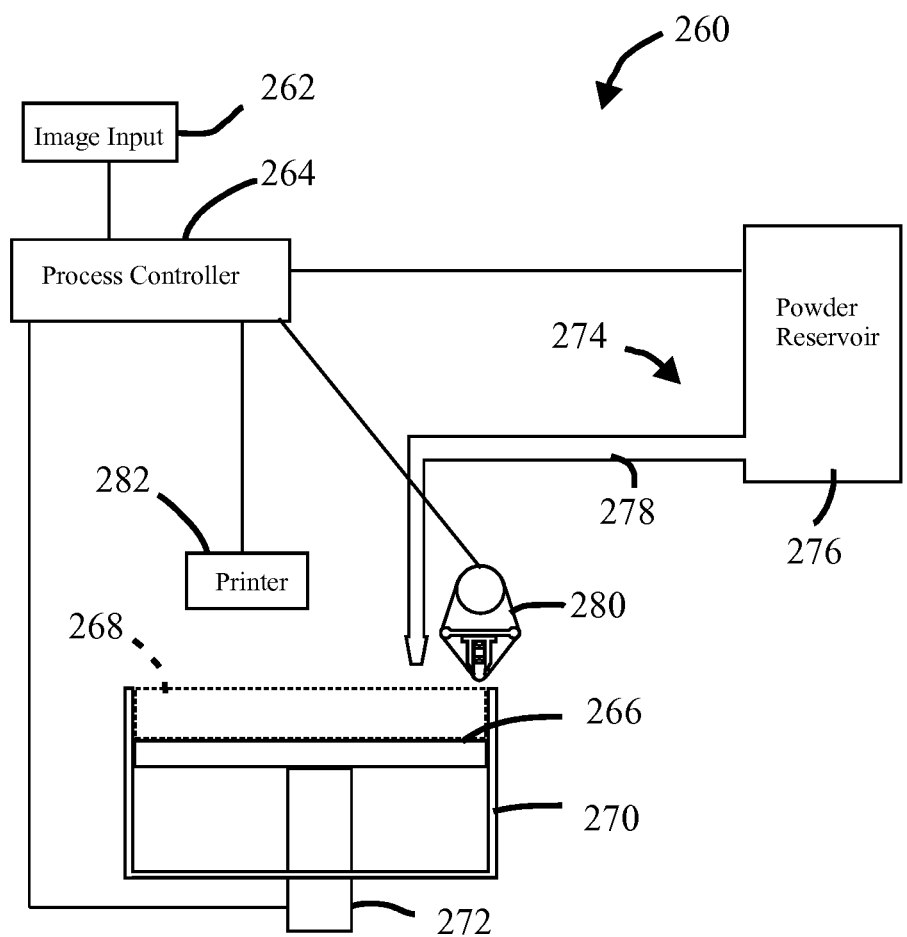
FIG. 13 is a schematic representation of a layered manufacturing system according to an embodiment of the present invention.

The present invention also includes layered manufacturing process systems that utilize the inventive powder spreaders described above. An example of such a layered manufacturing system is illustrated schematically in FIG. 13 as layered manufacturing system 260. Layered manufacturing system 260 includes an image input device 262 for supplying a computer representation of the object or objects to be made to a process controller 264. The system 260 also includes a support surface 266 upon which the powder bed 268 (outlined in dashed lines) is formed. The support surface 266 is typically supported within a build box 270 by a piston 272 which is configured to move the support surface 266 incrementally downward as each new powder layer is formed in the powder bed 268. The system 260 also comprises a powder supply system 274 which includes a powder reservoir 276 and a powder conveying system 278 for supplying the powder first to the top surface of the support surface 266 and thereafter to the top surface of the powder bed 268. The system 260 also includes a powder spreader 280 for distributing the powder delivered by the powder delivery system 274 as single layers of selected thickness. The system 260 also includes a printer 282 for selectively exposing portions of a powder layer that has been formed by the powder spreader 280 to radiation and/or a fluid to form a two-dimensional slice of the object or objects that are being manufactured. The system 260 also includes support and/or transport devices (not shown) for the identified components. The computer controller 264 is operatively connected to the powder supply system 274, the piston 272, the powder spreader 280, and the printer 282 to control the entire process from the formation of the first to last powder layer. In preferred embodiments of the present invention, the layered manufacturing system comprises a three-dimensional printing or a selective laser sintering process.

While only a few embodiments of the present invention have been shown and described, it will be obvious to those skilled in the art that many changes and modifications may be made thereunto without departing from the spirit and scope of the present invention as described in the following claims. All patent applications, patents, and all other publications referenced herein are incorporated herein in their entireties to the full extent permitted by law.

What is claimed is:

1. A powder spreader comprising:
 a) a flexible strip;
 b) a motor-driven first roll;
 c) a transportable nose guide;
 wherein as the nose guide is adapted to be transported longitudinally across a support surface behind a pile of deposited powder the first roll causes the strip to move over the nose guide to provide lift to the powder of the pile and to distribute the pile of powder in the form of a powder layer upon the support surface; and
 d) stiffening element includes a plurality of adjustable supports, at least one of the supports of the plurality of supports being independently adjustable to control the contour of the nose guide.

2. The powder spreader of claim 1, wherein said stiffening element for providing vertical and lateral support to the nose guide.

3. The powder spreader of claim 2, wherein at least one of the first roll and the nose guide are selectively movable so as to control the tension of the strip between the roll and the nose guide.

4. The powder spreader of claim 1, further comprising a tension device for controlling the tension and shape of the strip.

5. The powder spreader of claim 4, wherein the tension device has a first end for contacting a surface of the strip, wherein the position of the first end is selectable to control a lead angle formed between the strip and the support surface or a trailing angle formed between the strip and the surface of the powder layer.

6. The powder spreader of claim 1, wherein the strip is in the form of an endless loop.

7. The powder spreader of claim 1, further comprising a transport device adapted to move the nose guide longitudinally across the support surface.

8. The powder spreader of claim 1, further comprising a second roll, the first and second rolls being configured to cooperate as a pair of supply and take up reels for the strip and to move the strip over the nose guide.

9. The powder spreader of claim 8, wherein said stiffening element for providing vertical and lateral support to the nose guide.

10. The powder spreader of claim 8, further comprising a tension device for controlling the tension and shape of the strip.

11. The powder spreader of claim 10, wherein the tension device has a first end for contacting a surface of the strip, wherein the position of the first end is selectable to control a lead angle formed between the strip and the support surface or a trailing angle formed between the strip and the surface of the powder layer.

12. The powder spreader of claim 8, further comprising a transport device adapted to move the nose guide longitudinally across the support surface.

13. The powder spreader of claim 1, wherein the strip comprises a material selected from the group consisting of rubber, polytetraflouroethylene, polystyrene, and polyethylene.

14. A layered manufacturing system comprising:
 a) a process controller;
 b) a powder delivery system;
 c) a printer;
 d) a support surface; and
 e) a powder spreader having
  i) a flexible strip;
  ii) a motor-driven first roll;
  iii) a transportable nose guide; wherein as the nose guide is adapted to be transported longitudinally across a support surface behind a pile of deposited powder the first roll causes the strip to move over the nose guide to provide lift to the powder of the pile and to distribute the pile of powder in the form of a powder layer upon the support surface; and
  iv) stiffening element includes a plurality of adjustable supports, at least one of the supports of the plurality of supports being independently adjustable to control the contour of the nose guide;
 wherein the process controller is operably connected to the powder delivery system, the printer, the support surface, and the powder spreader to control the layered manufacturing system to form a three dimensional article.

15. The layered manufacturing system of claim 14, wherein the layered manufacturing system is a three-dimensional printing system.

16. The layered manufacturing system of claim 14, wherein the layered manufacturing system is a selective laser sintering system.

17. The layered manufacturing system of claim 14, wherein said stiffening element for providing vertical and lateral support to the nose guide.

18. The layered manufacturing system of claim 14, wherein the powder spreader further comprises a tension device for controlling the tension and shape of the strip.

19. The layered manufacturing system of claim 18, wherein the tension device has a first end for contacting a surface of the strip, wherein the position of the first end is selectable to control a lead angle formed between the strip and the support surface or a trailing angle formed between the strip and the surface of the powder layer.

20. The layered manufacturing system of claim 14, wherein the strip is in the form of an endless loop.

21. The layered manufacturing system of claim 14, wherein the powder spreader further comprises a second roll, the first and second rolls being configured to cooperate as a pair of supply and take up reels for the strip and to move the strip over the nose guide.

22. The layered manufacturing system of claim 21, wherein said stiffening element for providing vertical and lateral support to the nose guide.

23. The layered manufacturing system of claim 14, wherein the strip comprises a material selected from the group consisting of rubber, polytetraflouroethylene, polystyrene, and polyethylene.

\* \* \* \* \*